United States Patent [19]

Ekola

[11] Patent Number: 4,691,579
[45] Date of Patent: Sep. 8, 1987

[54] TENSION TRANSDUCER

[76] Inventor: Kenneth E. Ekola, 574 - 6th St., Dover, N.H. 03820

[21] Appl. No.: 870,113

[22] Filed: Jun. 3, 1986

[51] Int. Cl.[4] .............................................. G01L 5/10
[52] U.S. Cl. ................................................ 73/862.48
[58] Field of Search ............ 73/862.47, 862.48, 862.65

[56] References Cited

U.S. PATENT DOCUMENTS

| | | | |
|---|---|---|---|
| 3,763,701 | 10/1973 | Wright et al. ..................... | 73/862.48 |
| 4,326,424 | 4/1982 | Koenig ............................. | 73/862.48 |

FOREIGN PATENT DOCUMENTS

| | | | |
|---|---|---|---|
| 2452925 | 5/1976 | Fed. Rep. of Germany ... | 73/862.48 |
| 2520672 | 11/1976 | Fed. Rep. of Germany ... | 73/862.65 |
| 2094984 | 9/1982 | United Kingdom ............. | 73/862.57 |

OTHER PUBLICATIONS

*Dover Flexo Electronics*, Pub. 117-CPO 485 R-O, "Web Tension Controls Offer Advanced Technology".
*Dover Flexo Electronics*, Pub. 110 CPC-R1, "Tension Transducers for Non-Rotating Idler Roll Shaft".
*Comptrol Incorporated Bulletin* A-77, reprinted from *Power Transmission Design* magazine, Jul., 1984 issue, copyright 1984, by Penton/IPC, Inc.
*FAG KraftmeBsystem MGZ*, Publ. Nr. 55 123/2DA, pp. 3 & 4 (FAG Kugelfischer Georg Schafer & Co.).
*Cleveland-Kidder Engineering data sheet DS-TRS*-1182 (Cleveland Machine Controls, Inc.)-"Tension Transducers for Measurement and Control of Tension in Moving Webs".
*Designer's Notebook*, 1983-1984 *Edition* (Magnetic Power Systems, Inc., Subsidiary of WJ Industries), pp. 46 & 48.

*Primary Examiner*—Charles A. Ruehl
*Attorney, Agent, or Firm*—Hayes, Davis & Soloway

[57] ABSTRACT

An improved transducer of a cantilevered beam type wherein a force to be measured is applied perpendicularly to the end of the beam through the joint and the improved joint comprises a self-aligning first roller bearing having an axially aligned center bore and a cylindrical outer surface. A cylindrical inner member is carried by the end of the beam while a cylindrical outer member is provided having cylindrical inner and outer surfaces. The cylindrical inner surface is of a diameter to be a sliding fit about the outer surface of the first roller bearing and has parallel, spaced, inward facing ridges thereon of a spacing greater than the width of the first roller bearing. A biasing device urges the first roller bearing toward a neutral position. A second roller bearing having a center bore with a radius larger than the radius of the cylindrical outer surface of the cylindrical outer member is disposed concentrically thereabout in alignment with the first roller bearing. There is a device for non-movably supporting the second roller bearing with respect to the cantilevered beam. The force receiving device comprises a cylindrical bushing for receiving a shaft to be supported by the first roller bearing.

11 Claims, 7 Drawing Figures

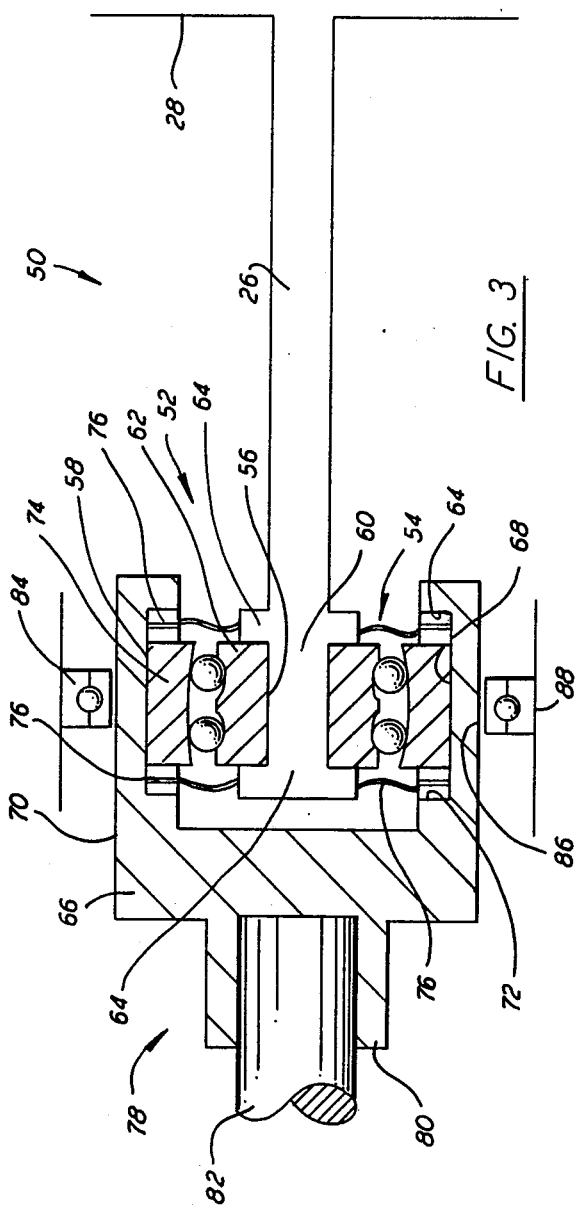
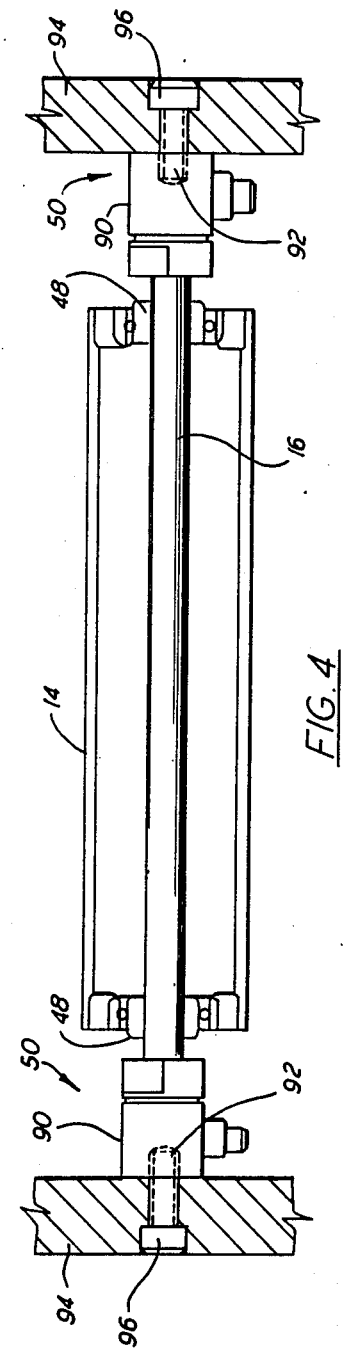
FIG. 3
FIG. 4

TENSION TRANSDUCER

BACKGROUND OF THE INVENTION

The present invention relates to transducers of the cantilevered beam type wherein a force to be measured is applied perpendicular to the end of the beam through a joint and, more particularly, to a novel transducer and the improved joint used therein comprising, a self-aligning first ball bearing having an axially aligned center bore and a cylindrical outer surface; a cylindrical inner member carried by the end of the beam adapted to receive the center bore as a snug fit thereon; a cylindrical outer member having cylindrical inner and outer surfaces, the cylindrical inner surface being of a diameter to be a sliding fit about the cylindrical outer surface of the first ball bearing, the cylindrical inner surface also having parallel, spaced, inward-facing ridges thereon of a spacing greater than the width of the first ball bearing, the cylindrical outer member further including means for receiving a force to be measured; bias means disposed between the inward-facing ridges and the first ball bearing for resiliently urging the first ball bearing towards a neutral position; a second ball bearing having an axially aligned center bore of a radius larger than the radius of the cylindrical outer surface of the cylindrical outer member by an amount equal to the maximum deflection to be allowed, the secnd ball bearing being disposed concentrically about the cylindrical outer member in alignment with the first ball bearing; and, means for non-movably supporting the second ball bearing with respect to the support of the cantilevered beam.

Tension transducers are well known in the art and are manufactured and sold commercially by a number of companies including the applicant's company, Dover Flexo Electronics, Inc. A web tension transducer is used to measure tension in any moving web. The output signal produced can be displayed for manual control of the tension or can be used for automated control. They are typically used on printing presses, coaters, laminators, textile machines, slitter-rewinders, sheeters, paper making machines, and any other machine which in some way processes a continuous web of paper, plastic film, metal, textile, non-woven textile, felt, rubber, or any combination of the foregoing. Variations of web tension can cause web breakage, slack web, wrinkling, curling, stretching, and in general, poor quality product and excessive waste. These problems can be eliminated by proper control of web tension. The basis of proper control is tension measurement. The basis of measurement is a transducer which will convert a force (web tension) into an electrical signal which can be used for control purposes. The transducer must be accurate regardless of web speed and tension or it will not allow the correction of the aforementioned problems.

A typical application for such transducers is shown in simplified form in FIG. 1 wherein a moving web 10 is directed over rollers 12 and 14. The non-rotating shaft 16 of roller 14 is supported on the ends by tension transducers 18. The tension in the web 10 is sensed by the transducers 18 which, in turn, send electrical signals to the control circuit generally indicated as 20. The control circuit 20 then controls a brake 22 on the supply roll 24 to adjust the tension in the web 10 to a pre-established/adjustable level.

A prior art tension transducer and the joint contained therein for connecting to the shaft 16 is shown in simplified form in FIG. 2. The transducer 18 comprises a beam 26 extending horizontally outward from a rigid support at 28. Strain gauges 30, of a type well known in the art, are attached to the beam 26 and provide the above-described electrical signals as a function of any bending of the beam 26. The outer end of the beam 26 is provided with a joint, generally indicated as 32, by which the beam 26 is connected to the shaft 16. The joint comprises an inner member 34 and an outer member 36. Since the shaft 16 is non-rotating, the joint 32 is an adaption of the U-joint construction employed with rotating shafts such as the drive shaft of an automobile. The outer member 36 has a socket 38 for receiving the shaft 16. A yoke 40 straddles the inner member 34 and is free to pivot in the direction of the arrows 42 around balls 44, which are disposed between the yoke 40 and the inner member 34, where they are located by sockets (not shown) in the inner member 34 and by slots (not shown) in the yoke 40. The slots in the yoke 40 allow limited longitudinal movement in the direction of the arrow 46. The pivoting action of the joint 32 allows for minor misalignment while the longitudinal sliding action of the balls 44 in the slot allows for differences in shaft length as well as expansion and contraction due to temperature differences. The roller 14 is mounted on the shaft 16 by means of ball bearings such as that indicated as 48. Beam deflection is measured in a manner well known in the art by placing a pair of strain gauges 30 disposed as shown on opposite sides of the beam 26. The electrical signals from the two gauges 30 are then arithmetically processed to eliminate the portion resulting from the twisting of the beam 26.

The deflection of an end-loaded cantilever beam (such as beam 26 described above) is very linear with applied load if the deflection is small. The amount of deflection at the end of the beam is given by the formula $Y = PL^3/3EI$; where, Y is the deflection, P is the load, L is the beam length, E is the modulus of elasticity of the beam material, and I is the moment of inertia of the beam. This formula is valid when the load is applied perpendicularly to the beam, which is not true if the deflection is large. Also, the formula only applies to pure cantilever bending. No other forces or moments can be applied or the linearity and accuracy of the deflection/load relationship will be affected. All deflection must be caused by the applied load alone. The purpose of the joint 32 (or its equivalent) is to ensure this is true to the highest possible degree.

The joint is necessary because web tension transducers are used in pairs. The transducers are mounted firmly on the inside surfaces of opposed machine frame members and a strong shaft is clamped into them. The web passes over the shaft (or, more typically, a tube rotating on bearings on the shaft as described above) and produces a force perpendicular to the shaft proportional to web tension. The machine frame members are immovable. If the shaft were clamped directly to the beam, instead of through a joint, a bending moment would be applied to the end of the beam and the deflection curve would be non-linear. Also, the shaft is not perfectly rigid and will bend as load is applied. The bending shortens the distance between the ends slightly producing an effective reduction in length as well as a change in angle at the ends. The effects of the bending moment, distance change, and angle change must be eliminated if the deflection of the beam is to be linear with applied load. The joint must be designed to do this.

As will be readily recognized from the above discussion relative to the prior art tension transducer of FIG. 1 in general and the joint thereof in particular, there are certain drawbacks associated therewith which would be desirable to correct to realize an improved tension transducer and an improved joint for use in that tension transducer, as well as in any similar application. For one thing, the transducer of FIG. 1 cannot be used with a rotating shaft. For another, a separate bearing must be used to support the weight of the shaft. Also, there is no adequate provision for protection for the transducer in the event that there is too much deflection for any reason or in the event that a momentary bearing seizure, or the like, imparts a large rotational force on the shaft and into the transducer. In these latter instance, of course, the prior art transducer can be seriously damaged. Yet another consideration of the prior art transducer and its joint is the tolerance/friction tradeoff; that is, if the fit of the pin and slot is tight enough to prevent error-producing slop, there may be considerable friction, which could, itself, introduce an error into the tension measurement.

Wherefore, it is an object of the present invention to provide a tension transducer of the cantilever beam type which can be used with either non-rotating or rotating shafts.

It is a further object of the present invention to provide a tension transducer of the cantilever beam type which incorporates safety provisions against overload, overbending, and rotational torque.

It is yet another object of the present invention to provide a tension transducer of the cantilever beam type which provides a tight tolerance joint with low friction.

Other objects and features of the present invention will become apparent from the discussion and accompanying drawings contained hereinafter.

SUMMARY

The foregoing objects have been realized in a transducer of the cantilevered beam type wherein a force to the measured is applied perpendicular to the end of the beam through a joint by the improved joint of the present invention comprising, a self-aligning first ball bearing having an axially aligned center bore and a cylindrical outer surface; a cylindrical inner member carried by the end of the beam adapted to receive the center bore as a snug fit thereon; a cylindrical outer member having cylindrical inner and outer surfaces, the cylindrical inner surface being of a diameter to be a sliding fit about the cylindrical outer surface of the first ball bearing, the cylindrical inner surface also having parallel, spaced, inward-facing ridges thereon of a spacing greater than the width of the first ball bearing, the cylindrical outer member further including means for receiving a force to be measured; bias means disposed between the inward-facing ridges and the first ball bearing for resiliently urging the first ball bearing towards a neutral position; a second ball bearing having an axially aligned center bore of a radius larger than the radius of the cylindrical outer surface of the cylindrical outer member of an amount equal to the maximum deflection to be allowed, the second ball bearing being disposed concentrically about the cylindrical outer member in alignment with the first ball bearing; and, means for non-movably supporting the second ball bearing with respect to the support of the cantilevered beam.

In the preferred embodiment of the joint as incorporated into a novel tension transducer as also disclosed herein, the force receiving means comprising a cylindrical bushing for receiving a shaft to be supported by the first ball bearing; and wherein the bushing is disposed in axial alignment with the rotational axis of the first ball bearing whereby the shaft can rotate without damaging the joint or the transducer wherein it is incorporated.

Also in the novel tension transducer of the present invention, a Hall effect device is employed at the point of maximum beam deflection, replacing the strain gauges of the prior art so as to isolate the measuring element from the beam thereby to protect it from the effects of beam temperature, etc.

DESCRIPTION OF THE DRAWINGS

FIG. 3 is a simplified partially cutaway drawing of a tension transducer joint according to the present invention particularly adapted for use in the environment of FIG. 1.

FIG. 4 is a simplified partially cutaway drawing of a roller of the type shown in FIG. 1 showing the use of the transducer of the present invention in combination therewith and its preferred manner of mounting to the frame of the equipment.

DESCRIPTION OF THE PREFERRED EMBODIMENT

Figure 2:
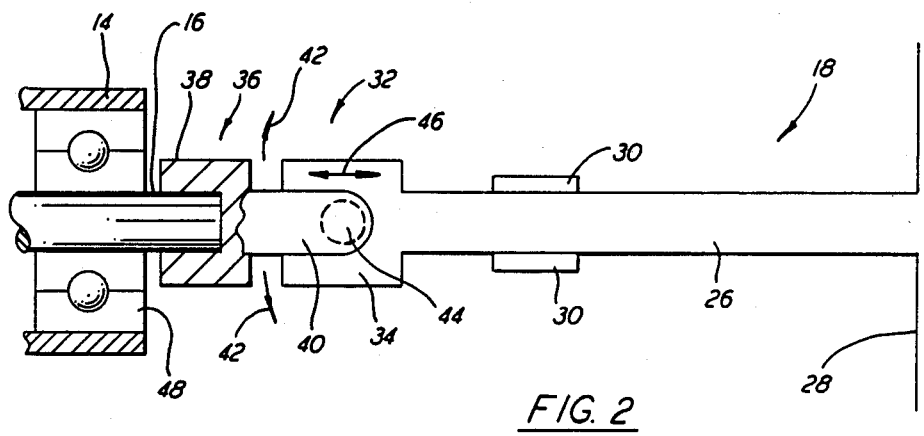
FIG. 2 is a partially cutaway simplified drawing of a prior art tension transducer of the type used in the environment of FIG. 1 which emphasis of the construction of the joint employed therein.

The novel joint structure of the present invention as incorporated into a tension transducer similar to the previously described prior art transducer of FIG. 2 is shown in FIG. 3. As will be appreciated by those skilled in the art, the joint could be used in any transducer or application wherein it is desirable to transmit a perpendicular deflection force from a shaft, or the like. Strain gauges could be used to measure the deflection or, as will be described later herein, a Hall effect device, or the like, could be used to obtain certain benefits in combination with the novel joint.

As in the prior art transducer of FIG. 2, the transducer 50 of FIG. 3 employs a cantilevered beam 26 rigidly attached to a frame member, or the like, at 28. The joint of the present invention is generally indicated as 52. Joint 52 comprises a self-aligning first ball bearing 54 having an axially aligned center bore 56 and a cylindrical outer surface 58. A cylindrical inner member 60 is carried by the end of the beam 26 and adapted to receive the center bore as a snug fit thereon. The inner race 62, containing the bore 56, is prevented from longitudinal movement by stop ridges 64. Cylindrical outer member 66 has cylindrical inner and outer surfaces 68 and 70, respectively. The cylindrical inner surface 68 is of a diameter to be a sliding fit about the cylindrical outer surface 58 of the ball bearing 54. The cylindrical inner surface 68 also has parallel, spaced, inward-facing ridges 72 thereon of a spacing greater than the width of the outer race 74 of the ball bearing 54. A pair of wave springs 76 are disposed in the respective spaces between the ridges 72 and the outer race 74 so as to urge the outer race 74 to a neutral position from which it can slide either way against the biasing forces of the springs 76 to accommodate changes in length from temperature variations, and the like. The cylindrical outer member 66 furthr includes means at 78 for receiving a force to be measured. In the embodiment being described, the force receiving means 8 comprises a cylindrical bushing 80 for receiving a shaft 82 to be supported by the ball bearing 54. Note that the bushing 80 is disposed in axial alignment with the rotational axis of the ball bearing 54 such that the shaft 82 can rotate (either accidentally or intentionally) without damaging the joint 52 or the transducer wherein it is incorporated. A second (non-self-aligning) ball bearing 84 having an axially aligned center bore 86 of a radius larger than the radius of the cylindrical outer surface 70 of the member 66 (by an amount equal to the maximum deflection to be allowed) is concentrically disposed about the member 66 in alignment with the first ball bearing 54 and non-movably supported with respect to the cantilevered beam at 88.

As will be appreciated, the pivot function previously accomplished in the prior art joint by the pin rotating in the slot is now accomplished by the self-aligning ball bearing 54 with maximum dimensional tolerance and minimum friction. The longitudinal adjustability accomplished in the prior art by the pin sliding in the slot is now accomplished by the outer race 74 snugly sliding within the inner surface 68 with minimal dimensional tolerance. The ball bearing 54 is sized so as to be able to be the main support for the shaft 82, which can be either rotating or non-rotating. The second ball bearing 84 is normally non-functional and only comes into play when the deflection of the beam 26 has reached the outer limits as previously established by the spacing of the center bore 86 with respect to the outer surface 70. Upon reaching the maxium deflection, the second bearing 84 begins the support of the load in a rotating, minimum friction manner so as to protect the beam 26 from over-bending stresses and damage. Again, it should be pointed out and realized that the movement distances involved are quite small. For example, in a commercial embodiment of a tension transducer incorporating the above-described structure, the maximum allowable deflection before the second ball bearing 84 takes the load is 0.005 inches.

Figure 1:
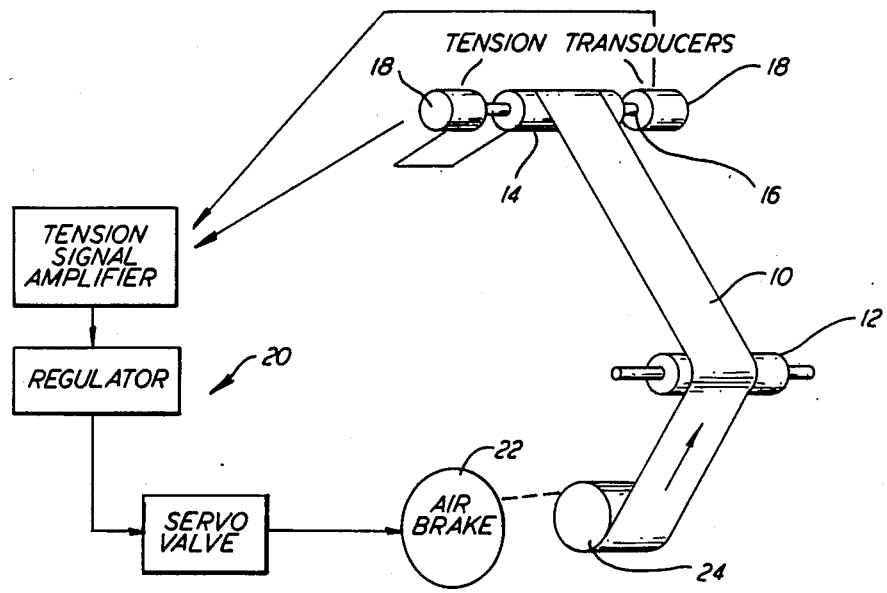
FIG. 1 is a simplified perspective drawing of the environment wherein the present invention is primarily useful.
Figure 5:
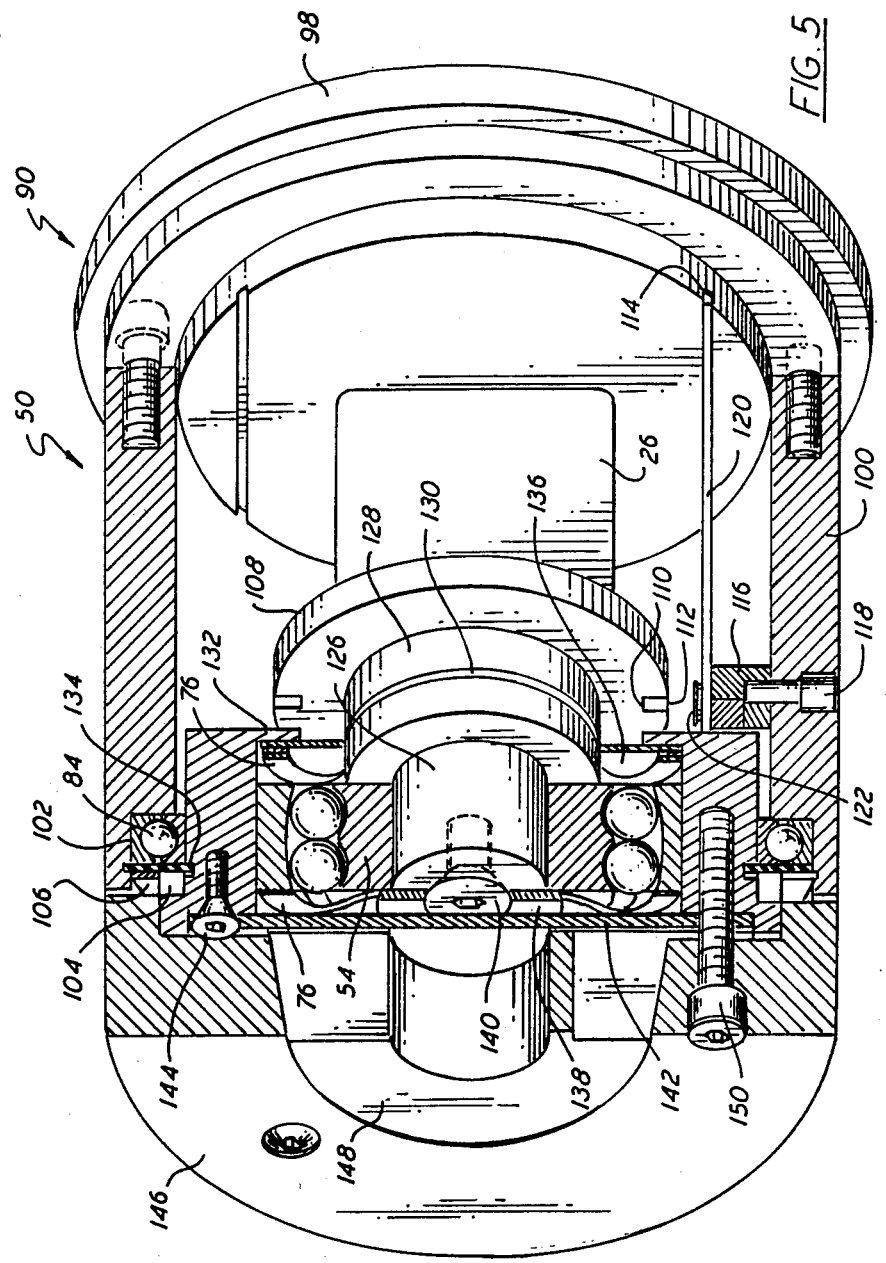
FIG. 5 is a partially cutaway perspective drawing of the transducer of the present invention in its preferred embodiment.
Figure 6:
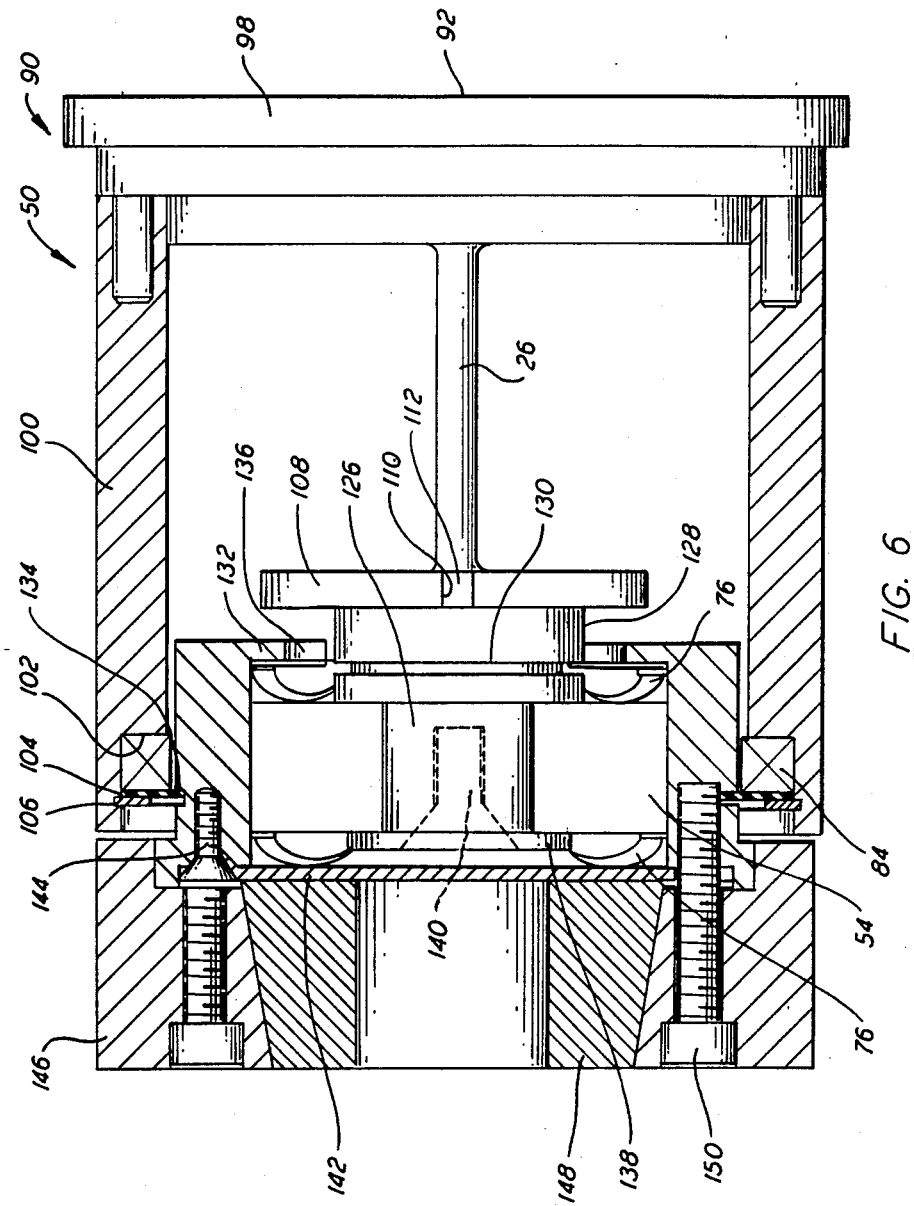
FIG. 6 is a partially cutaway drawing of the transducer of the present invention in its preferred embodiment cut through in a vertical plane.
Figure 7:
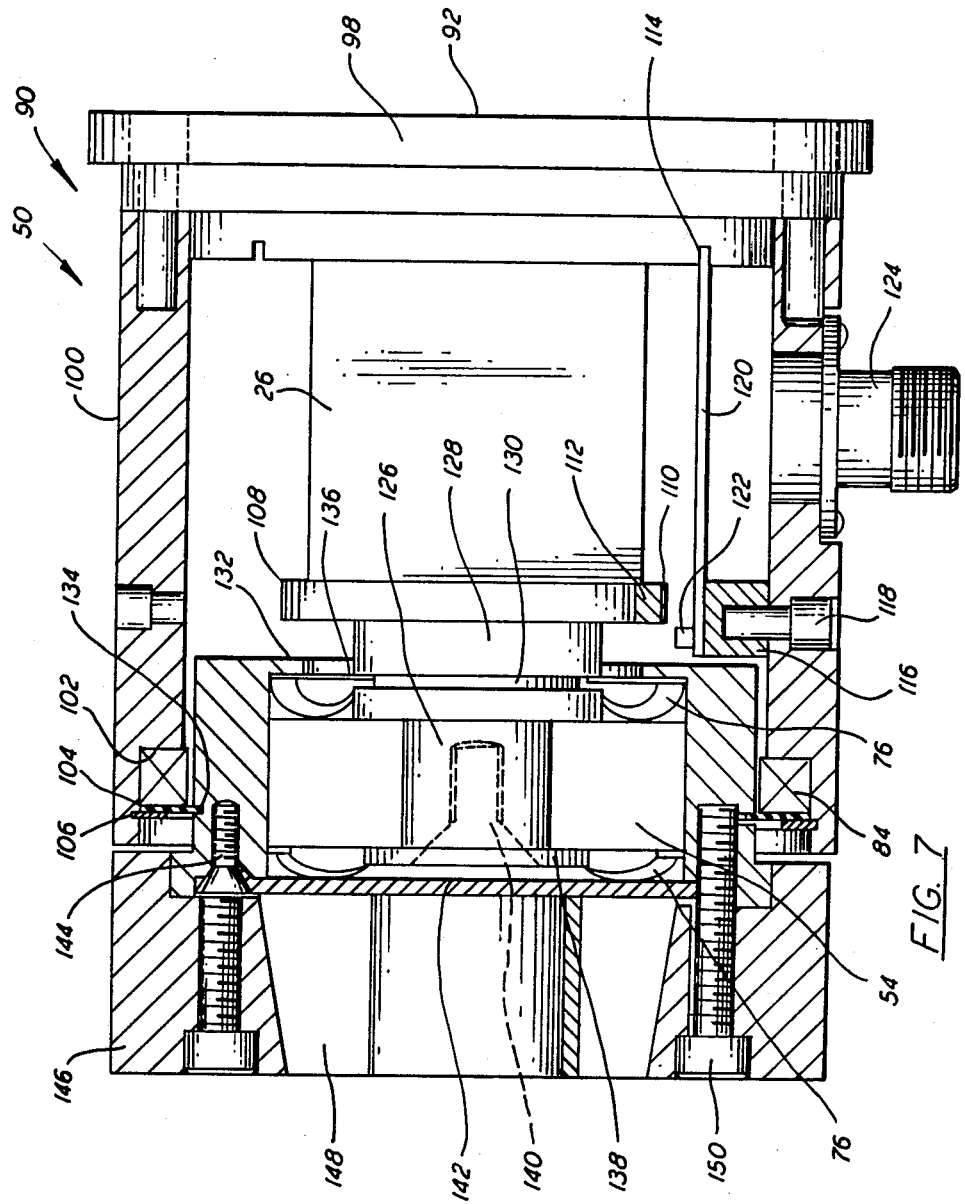
FIG. 7 is a partially cutaway drawing of the transducer of the present invention in its preferred embodiment cut through in a horizontal plane.

Turning briefly to FIG. 4, the preferred manner of mounting the transducer 50 of the present invention to support a roller such as that of FIG. 1 is shown therein. The main housing 90 of the transducer 50 contains a threaded bore 92 therein by which the housing 90, and thereby the transducer 50, can be rigidly mounted to the frame member 94 as with bolts 96. As will be appreciated from the preceding description, while a roller 14 such as that of FIGS. 1 and 2 having a non-rotating shaft 16 is depicted in FIG. 4, because of the present transducer's unique construction and capabilities, the bearings 48 could be omitted and the roller 14 and shaft thereof be rotated on the bearings 54 contained within the transducers 50. The commercial embodiment of a tension transducer incorporating the above-described joint as manufactured and sold by Dover Flexo Electronics, Inc. and as shown in detail in FIGS. 5–7 will now be described.

The previously described rigid support functions are provided by main housing 90, which comprises the circular back plate 98 to which is bolted the cylindrical outer shell 100. Cylindrical outer shell 100 contains an inner peripheral groove 102 into which the roller bearing 84 is press fit. The bearing 84 is maintained and protected within groove 102 by rubber sealing ring 104 and spring slip 106. The beam 26 extends outward perpendicular to the back plate 98 and has a circular disk 109 perpendicularly at the end thereof. The disk 108 has a slot 110 in the outer periphery into which is mounted a magnet 112. The back plate contains a slot 114 and the inside of the outer shell 100 is provided with an attachment standoff 116 held in place with bolt 118. A printed circuit board 120 is held in place by positioning its edge in the slot 112 and connecting it as with machine screws (not shown) to the standoff 116. The printed circuit board 120 contains a Hall effect device 122 positioned adjacent the magnet 112 so as to sense movement of the magnetic field relative thereto as a result of bending forces on the beam 26. Appropriate circuitry (well known to those skilled in the art and, therefore, not included herein for simplicity and to avoid redundancy) is included on the printed circuit board and connected to the Hall effect device 122 for developing the electrical signal of interest. The output thereof is conducted by wires (again not shown for simplicity) connected to the output connector 124. As will be seen from an inspection of the drawings, provisions are made for a second magnet and second printed circuit board disposed 180° with respect to the first.

A solid cylindrical shaft 126 extends concentrically outward from the circular disk 108 and provides the basis for the mounting of the remaining components. Collar 128 containing peripheral groove 130 is slid onto the shaft 126. Cylindrical outer member 66, having inner lip 132 and outer peripheral groove 134, is slid over the shaft 126 within the roller bearing 84. The inner edge of the sealing ring 104 snaps into the groove 134. A second rubber sealing ring 136 is then slipped over the collar 128 and against the lip 132 with its inner edge snapping into groove 130. A first wave spring 76 is then positioned over the collar 128 and against the sealing ring 136 followed by the ball bearing 54, which is slid onto the shaft 126 against the first wave spring 76. Circular retaining plate 138 is then concentrically attached to the outer end of the shaft 126 with the flat-headed machine screw 140, which is threaded into a concentric threaded bore provided for the purpose. The ball bearing 54 is, therefore, positively containing between outer limits of movement by the lip 132 and the retaining plate 138. A second wave spring 76 is then positioned concentrically around the retaining plate 138 and held in place by large circular cover plate 142, which is attached by the three flat-headed machine screws 144 threaded into the face of the outer member 66 at 120° radial spacings.

As a final step, the large cylindrical block 146 containing slotted bushing 148 concentrically therein is also attached to the face of the outer member 66 over the cover plate 142 by the three machine screws 150 which are threaded therein between the machine screws 144. The bushing 148 as supported by the block 146 is, of course, adapted to receive a shaft and transfer the load thereof rigidly to the outer member 66 and from there into the ball bearing 54 by means of which it is applied to the beam 26 to be sensed by the Hall effect device(s) 122.

As used herein "ball bearing" shall be construed to include "roller bearings" with respect to the second bearing 84 and, insofar as appropriate, to the self-aligning bearing (54).

Thus, from the foregoing simplified and detailed descriptions, it can be seen that the present invention includes both a novel tension transducer and a novel joint incorporated therein. As set forth in the objects, the tension transducer is of the cantilever beam type and can be used with either non-rotating or rotating shafts. Further, it incorporates safety provisions against overload, overbending, and rotational torque. Additionally, it provides a tight tolerance joint with low friction.

Wherefore, having thus described my invention, I claim:

1. In a transducer of the cantilevered beam type wherein a force to be measured is applied perpendicularly to the end of the beam through a joint, the improved joint comprising:
   (a) a self-aligning first roller bearing having an axially aligned center bore and a cylindrical outer surface;
   (b) a cylindrical inner member carried by the end of the beam adapted to receive said center bore as a snug fit thereof;
   (c) a cylindrical outer member having cylindrical inner and outer surfaces, said cylindrical inner surface being of a diameter to be a sliding fit about said cylindrical outer surface of said first roller bearing, said cylindrical inner surface also having parallel, spaced, inward-facing ridges thereon of a spacing greater than the width of the said first roller bearing, said cylindrical outer member further including means for receiving a force to be measured;
   (d) bias means disposed between said inward-facing ridges and said first roller bearing for resiliently urging said first roller bearing towards a neutral position;
   (e) a second roller bearing having an axially aligned center bore of a radius larger than the radius of said cylindrical outer surface of said cylindrical outer member by an amount equal to the maximum deflection to be allowed, said second roller bearing being disposed concentrically about said cylindrical outer member in alignment with said first roller bearing; and,
   (f) means for non-movably supporting said second roller bearing with respect to the support of the cantilevered beam.

2. The joint for a transducer of claim 1 wherein:
said bias means comprises a pair of wave springs disposed respectively on opposite sides of said first roller bearing.

3. The joint for a transducer of claim 1 wherein:
said force receiving means comprises a cylindrical bushing for receiving a shaft to be supported by said first roller bearing, said bushing being disposed in axial alignment with the rotational axis of said first roller bearing whereby the shaft can rotate without damaging the joint or the transducer wherein it is incorporated.

4. The joint for a transducer of claim 1 wherein:
said means for non-movably supporting said second roller bearing, with respect to the support of the cantilevered beam comprises a hollow cylindrical member concentrically surrounding said first roller bearing, carrying said second roller bearing and including means for rigidly supporting the beam.

5. The joint for a transducer of claim 4 wherein:
said means for rigidly supporting the beam comprises a circular bulkhead in one end of said cylindrical member carrying the beam extending axially perpendicular thereto.

6. A tension transducer of the cantilevered beam type comprising:
   (a) a main housing comprising a hollow cylindrical case member having a bulkhead in one end thereof;
   (b) a resiliently rigid deflectable beam extending axially perpendicular to said bulkhead into said cylindrical case member;
   (c) a self-aligning first roller bearing having an axially aligned center bore and a cylindrical outer surface;
   (d) a cylindrical inner member axially carried concentric with said cylindrical case member by the free end of said beam and adapted to receive said center bore as a snug fit thereon;
   (e) a cylindrical outer member having cylindrical inner and outer surfaces, said cylindrical inner surface being of a diameter to be a sliding fit about said cylindrical outer surface of said first roller bearing, said cylindrical inner surface also having parallel, spaced, inward-facing ridges thereon of a spacing greater than the width of said first roller bearing, said cylindrical outer member further including means for receiving a force to be measured and imparting it perpendicularly to said free end of said beam;
   (f) bias means disposed between said inward-facing ridges and said first roller bearing for resiliently urging said first roller bearing towards a neutral position;
   (g) a second roller bearing having an axially aligned center bore of a radius larger than the radius of said cylindrical outer surface of said cylindrical outer member by an amount equal to the maximum deflection to be allowed, said second roller bearing being carried by said cylindrical case member concentrically about said cylindrical outer member in alignment with said first roller bearing; and
   (h) signal producing means for converting any bending of said beam into an electrical signal proportional to said bending at an output thereof.

7. The transducer of claim 6 wherein:
said bias means comprises a pair of wave springs disposed respectively on opposite sides of said first roller bearing.

8. The transducer of claim 6 wherein:
said force receiving means comprises a cylindrical bushing for receiving a shaft to be supported by said first roller bearing, said bushing being disposed in axial alignment with the rotational axis of said first roller bearing whereby the shaft can rotate without damaging the joint or the transducer wherein it is incorporated.

9. The transducer of claim 6 wherein said signal producing means comprises:
   (a) a magnet carried by said free end of said beam; and,
   (b) circuit means carried by said main housing including a Hall effect device disposed adjacent said magnet for developing said output signal as a result of changes in said Hall effect device resulting from the magnetic field of said magnet moving with respect to said Hall effect device in combination with bending of said beam.

10. In a transducer of the cantilevered beam type wherein a force to be measured is applied perpendicularly to the end of the beam, the method of coupling a shaft providing the force to the beam to accommodate changes in shaft length and shaft misalignment comprising the steps of:
 (a) providing a self-aligning first roller bearing having an axially aligned center bore and a cylindrical outer surface;
 (b) axially attaching a cylindrical inner member to the end of the beam adapted to receive the center bore as a snug fit thereon and positioning the first roller bearing thereon;
 (c) disposing a cylindrical outer member having cylindrical inner and outer surfaces concentrically about the first roller bearing, the cylindrical inner surface being of a diameter to be a sliding fit about the cylindrical outer surface of the first roller bearing, the cylindrical inner surface also having parallel, spaced, inward-facing ridges thereon of a spacing greater than the width of the first roller bearing, the cylindrical outer member further including an axially disposed socket for receiving the shaft;
 (d) disposing bias means between the inward-facing ridges and the first, roller bearing to resiliently urge the first roller bearing towards a neutral position;
 (e) disposing a second roller bearing having an axially aligned center bore of a radius larger than the radius of the cylindrical outer surface of the cylindrical outer member by an amount equal to the maximum deflection to be allowed concentrically about the cylindrical outer member in alignment with the first roller bearing;
 (f) non-movably supporting the second roller bearing with respect to the support of the cantilevered beam; and,
 (g) disposing the shaft in the socket whereby forces on the shaft perpendicular to the axis of the socket are transmitted through the socket to the cylindrical outer member, the first roller bearing, and the cylindrical inner member perpendicularly to the end of the beam.

11. The method of claim 10 wherein:
 said step of disposing bias means comprises disposing a pair of wave springs respectively on opposite sides of the first roller bearing.

* * * * *